(12) United States Patent
Innerebner et al.

(10) Patent No.: US 7,407,611 B2
(45) Date of Patent: Aug. 5, 2008

(54) ELASTOMER MIXTURES FOR RUBBER MANUFACTURE

(75) Inventors: Federico Innerebner, Zürich (CH); Erhard Krumpholz, Niederuzwil (CH); Christoph Näf, Winterthur (CH); Achim-Philipp Sturm, Niederuzwil (CH); Bernhard Stalder, Niederuzwil (CH); Roland Halter, St Gallen (CH)

(73) Assignee: Buhler AG, Uzwil (CH)

( * ) Notice: Subject to any disclaimer, the term of this patent is extended or adjusted under 35 U.S.C. 154(b) by 332 days.

(21) Appl. No.: 10/798,350

(22) Filed: Mar. 12, 2004

(65) Prior Publication Data

US 2004/0222543 A1    Nov. 11, 2004

Related U.S. Application Data

(63) Continuation of application No. PCT/CH02/00477, filed on Sep. 2, 2002.

(51) Int. Cl.
B29C 47/00    (2006.01)
B29B 9/00    (2006.01)

(52) U.S. Cl. .................. 264/141; 264/86; 264/102; 264/211; 523/333; 523/334

(58) Field of Classification Search ............ 264/211.23, 264/349, 141, 102, 142, 211; 425/208
See application file for complete search history.

(56) References Cited

U.S. PATENT DOCUMENTS

| | | | |
|---|---|---|---|
| 3,178,390 A | 4/1965 | Reed et al. | |
| 4,927,587 A * | 5/1990 | Takahashi et al. | 264/211 |
| 5,029,760 A * | 7/1991 | Gamblin | 241/65 |
| 5,151,026 A * | 9/1992 | Andersen et al. | 425/204 |
| 5,158,725 A * | 10/1992 | Handa et al. | 264/40.7 |
| 5,158,784 A * | 10/1992 | Semmekrot | 425/208 |
| 5,205,972 A * | 4/1993 | Kafka | 264/101 |
| 5,232,649 A * | 8/1993 | Andersen et al. | 264/211.23 |
| 5,374,387 A * | 12/1994 | Barnes et al. | 264/211.23 |
| 5,501,804 A * | 3/1996 | Hall et al. | 210/805 |
| 5,597,235 A * | 1/1997 | Barnes et al. | 366/76.6 |
| 5,711,904 A | 1/1998 | Eswaran et al. | |
| 5,817,266 A * | 10/1998 | Guntherberg et al. | 264/211.23 |
| 6,040,364 A * | 3/2000 | Mabry et al. | 523/318 |
| 6,165,399 A * | 12/2000 | Guntherberg et al. | 264/102 |
| 6,200,509 B1* | 3/2001 | Neubauer et al. | 264/118 |
| 6,413,458 B1* | 7/2002 | Pearce | 264/141 |
| 6,548,574 B1* | 4/2003 | Mathur et al. | 523/212 |
| 6,908,961 B2* | 6/2005 | Wang et al. | 524/495 |

(Continued)

FOREIGN PATENT DOCUMENTS

EP    1 035 155 A1    2/2000

(Continued)

*Primary Examiner*—Mary Lynn F Theisen
(74) *Attorney, Agent, or Firm*—Buchanan Ingersoll & Rooney PC

(57) ABSTRACT

A method is disclosed for producing elastomer compounds for use in the production of rubbers. At least one elastomer to be processed for the production of an elastomer mixture can be slowly added to a mixer/extruder and is mixed and plasticized and/or masticated (melted) while it passes through the mixer/extruder. The elastomer, when slowly added to the mixer/extruder, can be present in a fluid medium in an evenly distributed form.

32 Claims, 2 Drawing Sheets

U.S. PATENT DOCUMENTS

| | | | |
|---|---|---|---|
| 2002/0126569 A1* | 9/2002 | Silvi et al. | 366/91 |
| 2002/0197449 A1* | 12/2002 | Mende et al. | 428/166 |
| 2003/0111770 A1* | 6/2003 | Bohm et al. | 264/349 |
| 2003/0203992 A1* | 10/2003 | Mabry et al. | 523/335 |
| 2004/0048970 A1* | 3/2004 | Hagiwara et al. | 524/459 |
| 2004/0094862 A1* | 5/2004 | Sturm et al. | 264/211 |
| 2004/0262807 A1* | 12/2004 | Sturm et al. | 264/211.23 |

FOREIGN PATENT DOCUMENTS

| | | |
|---|---|---|
| EP | 1 110 691 A2 | 12/2000 |
| GB | 806362 | 11/1956 |
| WO | WO 02/30652 * | 4/2002 |

* cited by examiner

ELASTOMER MIXTURES FOR RUBBER MANUFACTURE

CROSS REFERENCE TO RELATED APPLICATIONS

This application claims priority under 35 U.S.C. §119 to German Application 101 45 392.2 filed in Germany on 14 Sep. 2001, and as a Continuation Application under 35 U.S.C. §120 to PCT/CH02/00477 filed as an International Application on 2 Sep. 2002 designating the U.S., the entire contents of which are hereby incorporated by reference in their entireties.

BACKGROUND

The invention relates to a method and device for manufacturing elastomer mixtures (elastomer compounds) to fabricate rubber articles, in which at least one elastomer to be processed for manufacturing the elastomer mixture is metered into a mixing extruder, and mixed and plasticized and/or masticated ("melted open") while passing through the mixing extruder.

Elastomer mixtures can include a continuous elastomer matrix and a filler incorporated into the elastomer matrix, and are starting products for rubber manufacture. For example, the unprocessed elastomer can be natural rubber or synthetic rubber, e.g., nitryl rubber. Soot particles or silicate particles can be used as the filler, for example. The degree of distribution and degree of dispersal (degree of dispersion) have been shown to considerably influence the technical properties of the rubber. In known methods for manufacturing such elastomer mixtures, closed mixers are used for dispersive and distributive mixing along with plasticizing and/or mastication of the filler or elastomer.

To simplify the manufacture of elastomer mixtures for the rubber industry, an attempt was made to replace the traditional forms of presentation of natural or synthetic rubber, e.g., ball form, with liquid or powdery elastomer as the raw material. In addition, the particle form of presentation is a precondition for continuous rubber mixture manufacture.

The use of liquid elastomers has thus far only been rudimentarily developed, since this would require a rethinking and considerable investment on the part of the rubber industry. However, it would seem that powdery elastomers are proving themselves as a starting material for the manufacture of elastomer mixtures in both discontinuous and continuous procedures. In turn, this made it necessary to provide methods for manufacturing powdery rubber. Methods were developed for spray-drying and freeze-drying of nitryl rubber or natural rubber. The flash evaporation method or milling procedures were also used to generate smaller particles. However, one disadvantage to all of these methods lies in the stickiness and creeping characteristic of the generated rubber particles. Nonetheless, powder products were fabricated by dusting the particles with very fine organic and inorganic powders to deactivate the cohesive effects. Unfortunately, undesired contaminants were introduced into the manufactured particles time and again as a result of these measures.

As a consequence, a method was developed for manufacturing rubber/filler mixtures in powder form. In this case, a stable rubber/water emulsion is first formed independent of the type and state of the rubber (e.g., solution or emulsion polymerizates, natural rubber or nitryl rubber). This emulsion receives a filler (soot or silicate) whose particle size distribution had previously been precisely set, and which exists in an aqueous suspension along with various additives. The latex emulsion and filler suspension were homogenized in a mixing container via intensive blending. The precipitation process is then concluded under continuous blending in a reaction container, and the obtained precipitation product is transferred to a homogenization container for further processing. The bulk of the water is then removed in a centrifuge, whereupon the finely distributed mixture is dried to a residual water content of less than 1%. The resultant rubber/filler mixtures obtained in a powder form are free-flowing after drying, and suitable for the manufacture of rubber products in a continuous procedure.

To manufacture the rubber or rubber articles, the powdery rubber/filler mixtures obtained in this way are then plasticized and/or masticated ("melted open") in a twin-shaft extruder along with softeners and other admixtures, which yields a continuous, liquid polymer matrix with filler particles suspended therein. Adding a vulcanizing agent creates additional crosslinkages between the elastomer molecules, so that the subsequently cooled "mass" has the desired rubbery properties. This makes it possible to fabricate tailor-made rubber mixtures depending on the type of used elastomer, and on the type, size and content of filler particles. Required to this end are at least two different powdery rubber/filler mixtures, from which a wide range of rubber mixtures can in turn be obtained by establishing a suitable mixture ratio between them.

EP-1035155A1 discloses such a method for manufacturing powdery, free-flowing rubber/filler mixtures (rubber/filler batches). The rubber and soot are precipitated to "granulates" (powdered rubber) via coagulation in a suspension with the corresponding rubber and soot. The powdered rubber has a round shape with a diameter of 1 to 3 mm, wherein the soot envelops the polymer. The soot is already present in a pre-distributed form. The soot enables easy handling, in particular simple storage and metering.

This method can basically be used to manufacture all important rubbers (natural or synthetic) as granulate. Various additives and softeners can be incorporated into the granulate, thereby simplifying the metering of components into the mixing aggregate.

However, it has also been shown that there are disadvantages to manufacturing rubber using powdery rubber/filler mixtures too. Specifically, an examination of the entire energy balance from natural rubber or artificial to the end product shows that this type of rubber manufacture is energy-intensive. Sine the water is already removed while manufacturing the powdered rubber (rubber/filler mixture), and this powdered rubber is subsequently "melted open" in a twin-shaft extruder along with a vulcanizing agent and other admixtures, a very high level of energy must be expended for melting open and incorporating the fillers. In addition to the high energy costs, care must here always be taken that the temperature of the product in the extruder does not exceed a critical temperature, since the elastomer might otherwise become damaged. The elastomer polymer chains are here broken down into smaller fragments and/or chemically modified by the high temperature, and/or additional organic constituents, in particular softeners, are broken down, and/or premature crosslinkage can be initiated in the presence of vulcanizing agent.

SUMMARY

A method for manufacturing elastomer mixtures for rubber manufacture is disclosed, in which the aforementioned problems of prior art can be eliminated, or at least ameliorated.

The elastomer is present in a uniformly distributed form in a first fluid medium during the metering process in the method mentioned at the outset for manufacturing elastomer mixture for rubber manufacture.

The elastomer present in a uniformly distributed form in a first fluid medium yields a lower viscosity as long as enough fluid medium is contained in the product to be processed, and simultaneously ensures a significantly better cooling than in a "dry" method due to the presence of the fluid, such as water.

Depending on the type of elastomer (natural rubber, synthetic rubber), etc., the first fluid medium can be a solvent in which the elastomer has been dissolved, or the elastomer can be present as an emulsion of an elastomer solution in a liquid not miscible with the solvent. If needed, the elastomer can also be present as a suspension of elastomer particles in a liquid, or as a gelatinous bond in a solvent.

A tightly combing, equidirectionally rotating multi-screw extruder, in particular a ring extruder, can be used as the mixing extruder. Advantages to a ring extruder includes its higher degassing power, narrower retention spectrum, shorter structural length and higher achievable degree of dispersion. This makes it possible to achieve the same results as with a twin-shaft extruder more efficiently.

In an exemplary embodiment, reinforcing materials, in particular soot or silicates, are introduced to the elastomer uniformly distributed in the first fluid medium before metering into the mixing extruder. The additional components necessary for rubber manufacture are hence incorporated at a point where the product to be processed still has a relatively slight viscosity given the still present first fluid medium. This also makes it possible to set the necessary viscosity, since a certain shearing energy is required for comminuting the components. This is influenced by the viscosity, among other things. The idea is to set the lowest possible viscosity still required to introduce enough shearing energy. This makes it possible to utilize the low viscosity set for the respective procedural step, so as to achieve an ideal distribution and comminution of components in the product even before dewatering and degassing.

As an alternative, the reinforcing materials, in particular the soot or silicates, can also be introduced to the elastomer uniformly distributed in the first liquid via direct metering into the mixing extruder.

It is here particularly advantageous if the reinforcing materials introduced to the elastomer are present as a suspension in a second fluid medium. This second fluid medium then also helps to diminish the viscosity or cool the product to be processed in the mixing extruder.

The reinforcing materials introduced to the elastomer can be prepared via wet milling in a device before being metered into the mixing extruder. This can avoid cases where the energy that is used for distributing and comminuting the reinforcing materials and partially converted into heat does not become directly introduced to the elastomer, thereby affording it thermal protection.

An agitating mill, in particular a conical agitating mill, or a centrifugal mill, can be used as the device for wet milling. Both the conical agitating ball mill and the centrifugal mill can be designed as pin mills, which also contain additional collision elements as required.

Additional components for the elastomer mixture used in rubber manufacture can be at least partially metered into the extruder. The additional components for the elastomer mixture can be other reinforcing materials or fillers, additives, vulcanizing agents, accelerators, softeners and aids.

In another embodiment, only filler is mixed in with the elastomer, and crosslinking agents are not metered in.

The product temperature in the mixing extruder can be kept under the vulcanizing temperature at least on the side opposite the conveying direction from the metering a point when metering a vulcanizing agent into the product. This can prevent the elastomer mixture from vulcanizing already while fabricating its mixture.

While incorporating and/or comminuting and/or distributing the components and reinforcing materials into the elastomer in the mixing extruder, the product in the mixing extruder can be gradually degassed.

In this case, the first and/or second fluid medium can be at least partially removed from the product as it passes through the mixing extruder in at least one dewatering step. This ensures a low viscosity at the beginning of the mixing process, when many components are still incorporated into the elastomer mixture. The dewatering and degassing can cause a rise in viscosity toward the end of the mixing process, but this rise is still acceptable at this point in time.

It can be particularly advantageous if the first and/or second fluid medium is removed via degassing or dewatering before metering in the vulcanizing agent. The presence of water often influences the reactivity of the vulcanizing agent. In addition, the mixture can be anhydrous at the end. Temperatures clearly exceeding 100° C. are typically used for vulcanization (introduced after the respective shaping). If water is still present, it causes the rubber mass to foam.

In another embodiment, the first and/or second fluid medium is removed in several dewatering steps as the product passes through the mixing extruder, wherein the filler is also incorporated in several incorporation steps as the product passes through the mixing extruder.

It can be particularly expedient if the incorporation steps and dewatering steps alternate in succession, wherein only as much is removed from the product during a dewatering step involving the first and/or second fluid medium as required to ensure optimal incorporation for the respectively ensuing incorporation step.

In a particularly advantageous embodiment of the method, the one or more dewatering steps take place at one or more lateral openings in the direction of product passage along the mixing extruder, wherein another lateral extruder is arranged on the at least one lateral opening of the mixing extruder, conveying toward and emptying into this opening. This lateral extruder allows the released water to escape from the product against the conveying direction of the lateral extruder, while the lateral extruder always causes the elastomer material to be retained in the mixing extruder.

If necessary, a coagulant can be added to the product. This is particularly expedient if the product is shaped when exiting the mixing extruder, e.g., for subsequent granulation. Under suitable conditions, this yields a formable and as yet unvulcanized initial product, which can be vulcanized in a final step after formed. This makes it possible to bring about an analogy between elastomer processing and thermoplastic processing that has been desired for many years.

When manufacturing long rubber articles, it is particularly advantageous to heat the product existing the mixing extruder along a vulcanization path in such a way that the polymers are continuously crosslinked. In the special case of long rubber articles, e.g., profiles, this provides a complete, continuous process proceeding from the raw materials latex and filler with initially abundant water and solvent to the completely formed, dewatered and finally crosslinked long rubber article end product.

BRIEF DESCRIPTION OF THE DRAWINGS

Additional advantageous, features and applications can be gleaned from the following description of exemplary embodiments, wherein.

DETAILED DESCRIPTION

Figure 1:
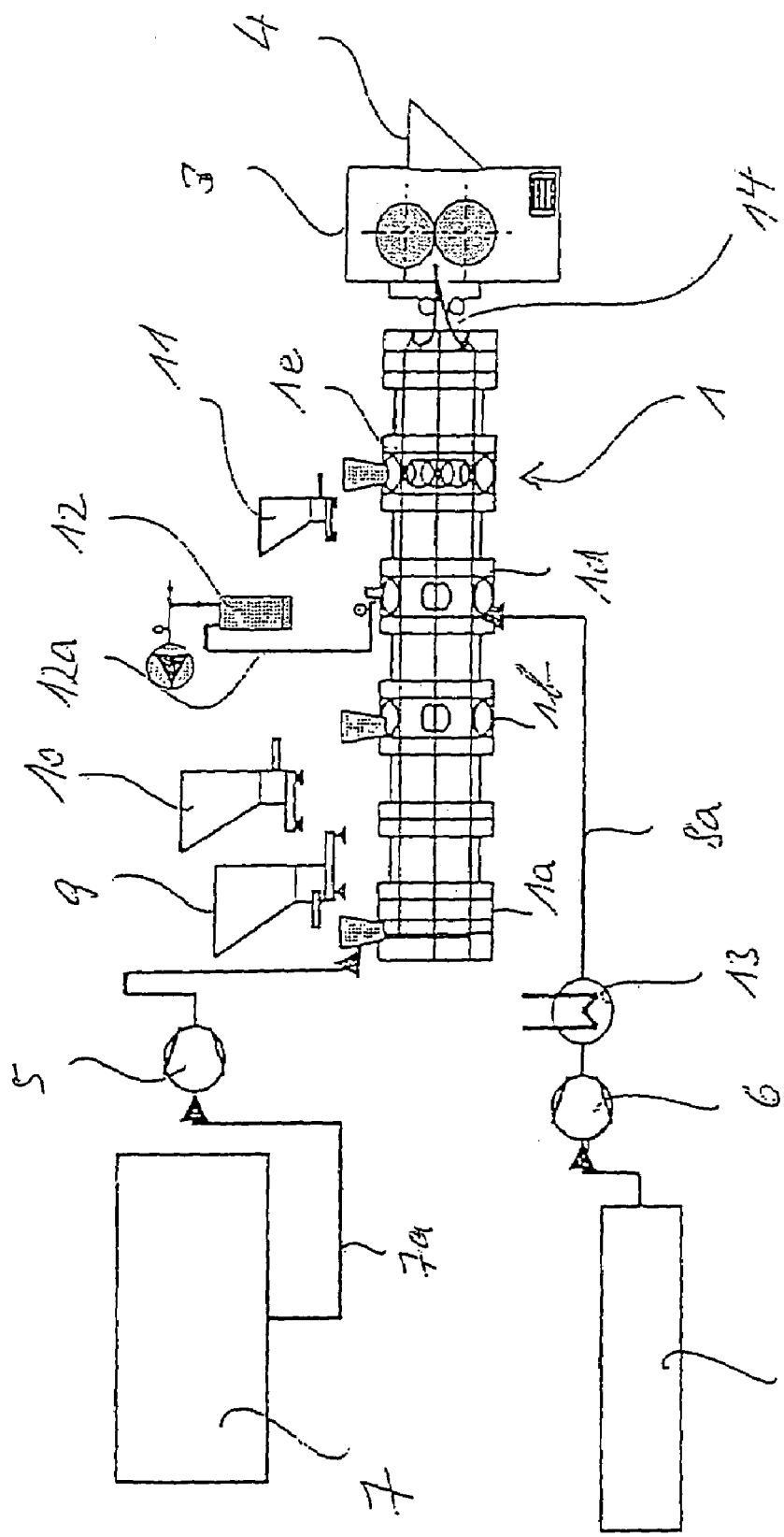
FIG. 1 shows a diagrammatic view of a device according to a first exemplary embodiment.

FIG. 1 shows a system for executing a procedure based on a first exemplary embodiment. A mixing extruder 1, such as a multi-screw extruder, (for example, a ring extruder) has several areas 1a, 1b, 1d and 1e in the direction of product passage that each correspond to different procedural steps. Reinforcing materials are charged in area 1a, additives and aids are charged in area 1b, product degassing takes place in area 1d, and vulcanizing agent is charged in area 1e. An extraction pump 3 and mold 4 are placed downstream from the mixing extruder. A supply tank 7 for latex emulsion or latex suspension is connected by line 7a with area 1a of mixing extruder 1, in which both elastomer and reinforcing materials are charged. The elastomer and latex emulsion or latex suspension are charged via a metering pump 5, while the reinforcing materials are supplied to the mixing extruder 1 in its area 1a by way of a weigh feeder 9. As with the reinforcing materials, further aids and additives are supplied to the mixing extruder in its area 1b by means of a weigh feeder 10. A supply tank 8 for softeners is connected by a line 8a with area 1d of mixing extruder 1. Therefore, area 1d is the site where the product is degassed on the one hand, and softener is added on the other. However, the softener can be already charged beforehand, e.g., in area 1b. This is because, as soon as the fluid medium has been degassed, viscosity can increase dramatically, and can be lowered with the softener. The evaporating point of the softener can clearly exceed 100° C. A metering pump 6 pumps the softener through line 8a, which also accommodates a heat exchanger 13 downstream from metering pump 6. The degassing also ongoing in area 1d takes place via a line 12a, which connects area 1d of mixing extruder 1 with a vacuum chamber 12. Finally, vulcanizing agent can be charged in area 1e of mixing extruder 1 by means of a weigh feeder 11.

Proceeding from the latex emulsion or latex suspension kept in storage tank 7 as well as the reinforcing materials, additives, aids, softeners and, finally, vulcanizing agent gradually charged in mixing extruder 1, a product resembling a web or strand can be obtained at the end of the extruder, comprised of a continuous elastomer matrix in which the reinforcing materials have been incorporated in a uniformly distributed manner. In addition to the reinforcing materials, this product 14 can also contain uniformly distributed vulcanizing agent.

When processing the product as it passes through mixing extruder 1, care can always be taken to keep the product temperature below a critical temperature of the product starting at which the polymer chains of the elastomer material are damaged and broken down. After charging the vulcanizing agent, i.e., behind area 1e of mixing extruder 1, care can also be taken to always keep the temperature below the vulcanizing point for the respective elastomer and vulcanizing agent. This ensures that the product web or strand exiting at the extruder end has polymer chains that are sufficiently long, but not yet crosslinked by the vulcanizing agent. This initial product 14 for manufacturing rubber articles can be granulated with the mold 4, if necessary. The granulated product 14 obtained in this way can then be melted open and processed further into various rubber articles, e.g., via injection molding, stretch blow molding or continuous profile molding and similar molding procedures, yielding end products made out of rubber. During this last further processing of the initial product 14 for manufacturing rubber, initial product 14 can then be heated to its vulcanization point, so that vulcanization can take place after molding. After molding, the elastomers can be calibrated and crosslinked according to the various known procedures for manufacturing rubber articles (profiles, etc.) via a vulcanization path.

As an initial product for rubber manufacture, the elastomer mixture 14 obtained forms a basis on which any rubber articles can be similarly fabricated, as already common practice today during the processing of thermoplastics.

One special advantage to the method is that the product containing, for example, high quantities of water or solvent, is not immediately, but only gradually dewatered as the product passes through mixing extruder 1. In this way, the product to be processed has an optimal viscosity, making it possible to keep the mechanical energy to be introduced for processing the product within optimal limits, which in turn yields a less intensive heating of the product. In addition, the presence of larger quantities of water or solvent in the product also rhoderates the temperature of the product to be processed in mixing extruder 1 due to the high heating capacity of the water. The dewatering areas of mixing extruder 1 (not shown) can be distributed over its entire length.

Figure 2:
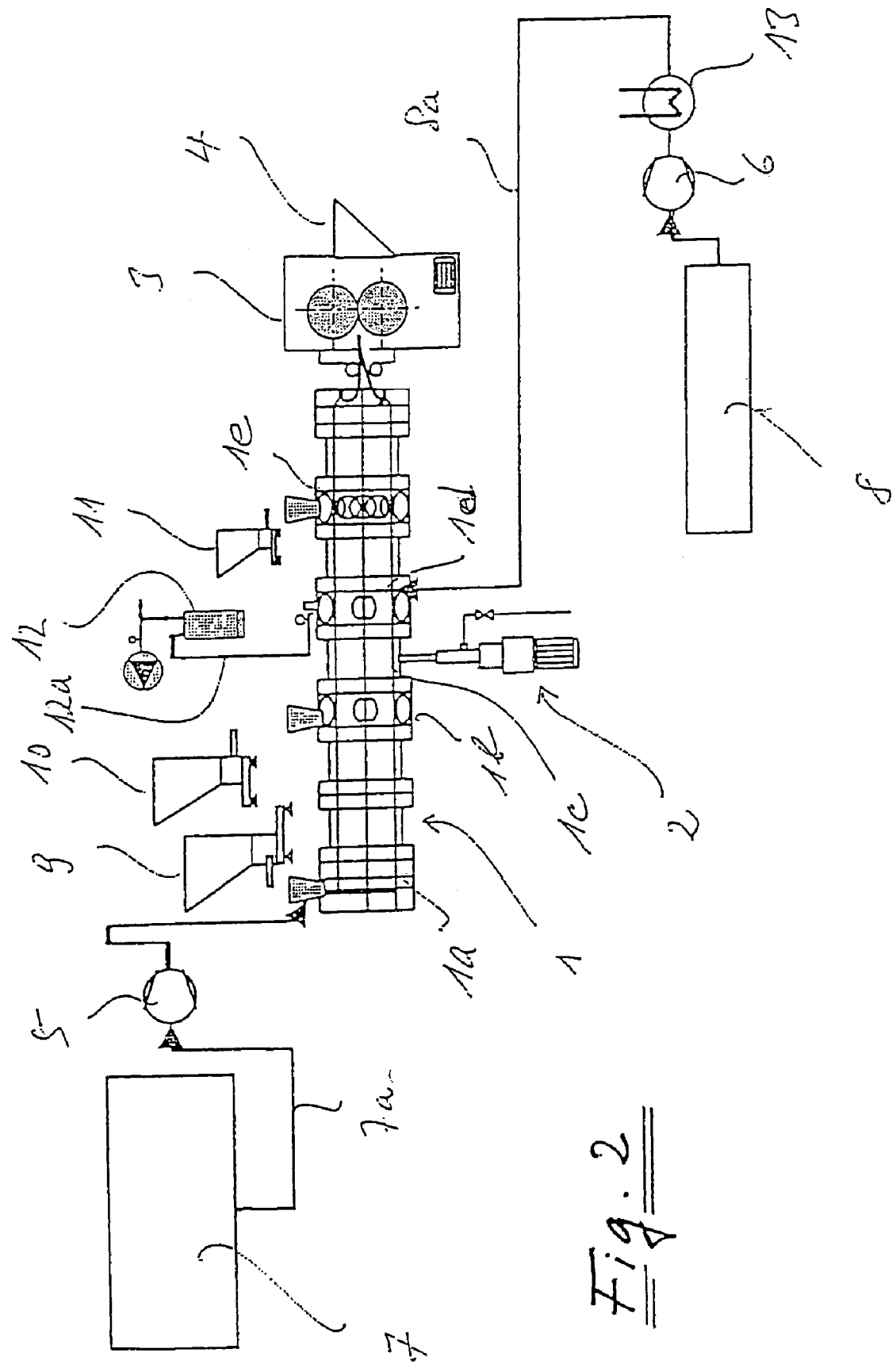
FIG. 2 shows a diagrammatic view of a device according to a second exemplary embodiment.

FIG. 2 shows a system for executing the method based on a second exemplary embodiment. The system on FIG. 2 differs from the system on FIG. 1 in that an area 1c is provided in mixing extruder 1 for dewatering the product to be processed in mixing extruder 1. Dewatering in area 1c takes place with a dewatering device. Degassing can also take place repeatedly.

Before the reinforcing materials are charged via weigh feeder 9, the reinforcing materials, e.g., comprised of soot or silicates, can be subjected to wet milling. In this case, a liquid weigh feeder can be used in place of the shown solid weigh feeder. The use of a conical agitating ball mill or centrifugal mill (not shown) is here particularly advantageous. A lateral extruder (not shown) that ends in area 1c of mixing extruder 1 intended for dewatering and conveys toward mixing extruder 1 can be used instead of the dewatering device 2 for product dewatering shown on FIG. 2. In this way, any elastomer material that exited in the lateral extruder (not shown) is immediately returned to mixing extruder 1, while water exiting in the lateral extruder along with the elastomer material can pass between the screw elements of the lateral extruder and casing of the lateral extruder against the conveying direction of the lateral extruder oriented toward mixing extruder 1. This produces a clean separation of water in area 1c of mixing extruder 1. All dewatering areas distributed over the entire length of mixing extruder 1 can be equipped with such a lateral extruder.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for manufacturing an elastomer mixture for manufacturing rubber, comprising:
   metering at least one elastomer to be processed for manufacturing the elastomer mixture into a mixing extruder;
   mixing and plasticizing and/or masticating the elastomer as the elastomer passes through the mixing extruder, the elastomer being present in a uniformly distributed form in a first fluid medium while being charged into the mixing extruder;
   introducing a reinforcing material in a second fluid medium to the elastomer;
   removing the first fluid medium and/or second fluid medium in several dewatering steps as the product passes through the mixing extruder; and
   incorporating a filler in several incorporation steps as the product passes through the mixing extruder;
   wherein the incorporation steps and dewatering steps alternate in succession.

2. The method according to claim 1, wherein the first fluid medium is a solvent in which the elastomer is present in dissolved form.

3. The method according to claim 2, wherein the elastomer is present as an emulsion of an elastomer solution in a liquid not miscible with the solvent.

4. The method according to claim 1, wherein the elastomer is present as a suspension of elastomer particles in a liquid.

5. The method according to claim 1, wherein the elastomer is present as a gel-like compound in a solvent.

6. The method according to claim 1, wherein the mixing extruder is a tightly meshing multi-screw extruder having screws that rotate in the same direction.

7. The method according to claim 1, wherein the reinforcing material is added to the elastomer dispersed in the first fluid medium before charging in the mixing extruder.

8. The method according to claim 1, wherein the reinforcing material is added to the elastomer dispersed in the first fluid medium via charging in the mixing extruder.

9. The method according to claim 7, wherein the reinforcing material added to the elastomer is present as a suspension in a second fluid medium.

10. The method according to claim 9, wherein the reinforcing material added to the elastomer is prepared via wet milling in a device before being metered into the mixing extruder.

11. The method according to claim 10, wherein the suspension of reinforcing material is wet milled in a gap between two coaxial rotating elements, which are rotated relative to each other around a shared axis, and generate a shearing field in the gap between the coaxial rotating elements.

12. The method according to claim 11, wherein the two coaxial rotating elements are a respective cylinder and cone, or a respective cone, configured so that the gap between the coaxial rotating elements narrows or expands in a product conveying direction.

13. The method according to claim 12, wherein one of the rotating elements is a rotor, and another of the rotating elements is a stator.

14. The method according to claim 13, wherein pin-like elevations extend from a surface of a respective rotating element in the gap, moving by each other as the rotating elements rotate, and colliding with suspended particles of the reinforcing material.

15. The method according to claim 14, wherein the gap incorporates collision elements that collide with the surface and/or the pin-like elevations of the rotating elements as well as with the suspended particles of reinforcing material during relative rotation of the rotating elements.

16. The method according to claim 10, wherein wet milling takes place with a centrifugal mill.

17. The method according to claim 1, wherein additional components for the elastomer mixture are at least partially charged in the mixing extruder.

18. The method according to claim 17, wherein the additional components are selected from the group consisting of: additives, vulcanizing agents, accelerators, softeners and aids.

19. The method according to claim 17, wherein no crosslinking agents are charged in the elastomer mixture.

20. The method according to claim 18, wherein a product temperature in the mixing extruder is kept under a vulcanizing temperature at least on a side opposite a conveying direction from a metering point when metering vulcanizing agent into the product.

21. The method according to claim 20, wherein the additional components and reinforcing material in the mixing extruder are incorporated and/or comminuted and/or distributed in the elastomer.

22. The method according to claim 1, wherein the product in the mixing extruder is degassed.

23. The method according to claim 1, wherein the first and/or second fluid medium is removed before charging a vulcanizing agent in the mixing extruder.

24. The method according to claim 1, wherein only as much product is removed from the first and/or second fluid medium during a dewatering step as required to ensure desired incorporation for an ensuing incorporation step.

25. The method according to claim 24, wherein one or more dewatering steps take place at one or more lateral openings in a direction of product passage along the mixing extruder, wherein a lateral extruder is arranged on at least one lateral opening of the mixing extruder, conveying toward and emptying into the at least one lateral opening.

26. The method according to claim 1, wherein the elastomer mixture is reacted with a coagulant.

27. The method according claim 1, wherein the elastomer mixture is molded as it exits the mixing extruder.

28. The method according to claim 27, wherein the molded elastomer mixture is granulated.

29. The method according to claim 27, wherein the molded elastomer mixture is heated along a vulcanization path in such a way that polymers continuously crosslink.

30. The method according to claim 1, wherein the elastomer mixture is a compound.

31. The method according to claim 7, wherein the reinforcing material is at least one of soot and silicate.

32. The method according to claim 1, wherein the reinforcing material added to the elastomer is present as a suspension in the second fluid medium.

* * * * *